United States Patent [19]
Kato et al.

[11] 3,856,488
[45] Dec. 24, 1974

[54] ELECTRIC VACUUM CLEANER

[75] Inventors: Satoru Kato; Kouki Fukuda; Kuninobu Nannichi, all of Ojima, Japan

[73] Assignee: Mitsubishi Denki Kabushiki Kaisha, Tokyo, Japan

[22] Filed: Sept. 4, 1973

[21] Appl. No.: 394,113

[30] Foreign Application Priority Data
Sept. 5, 1972 Japan................................ 47-102958
Sept. 5, 1972 Japan................................ 47-102960

[52] U.S. Cl................... 55/300, 15/327 E, 15/352, 55/305, 55/472, 55/480, 55/497, 55/509
[51] Int. Cl............................................ B01d 46/04
[58] Field of Search............ 55/300, 304, 305, 509, 55/467, 470, 471–473, 478, 480, 481, 498–499, 497; 15/327 E, 352

[56] References Cited
UNITED STATES PATENTS
2,253,698  8/1941  Goldsmith, Jr. ...................... 55/478
3,257,784  6/1966  Grellsson .......................... 15/327 R
3,591,888  7/1971  Chuji Takedo et al. .............. 55/300
3,621,640  11/1971 Ohno et al. ......................... 55/300

*Primary Examiner*—Bernard Nozick
*Attorney, Agent, or Firm*—Wenderoth, Lind & Ponack

[57] ABSTRACT

A housing for a blower detachably engages a dust collector casing. A filter of rectangular cross section is removably inserted into the casing and has two opposite filter elements formed of corrugated filter paper and a vent disposed on its end adjacent to the housing with that end surrounded by a packing. In the assembled position, an annular protrusion on the housing pushes against the packing to maintain it hermetically engaged by the casing. In order to remove dust on the filter paper, a dusting device can manually slide along the vent to vibrate the paper through U-shaped strips connected at the outer edge to the inner surfaces of the filtration walls.

4 Claims, 7 Drawing Figures

PATENTED DEC 24 1974

ELECTRIC VACUUM CLEANER

BACKGROUND OF THE INVENTION

This invention relates to improvements in an electric cleaner of the type comprising a dust collector casing forming a dust collection chamber and detachably connected to a housing for an electrically operated blower.

Conventional electric cleaners of the type referred to have comprised the filter in the form of a flat sheet provided at the outer peripheral edge with a flange and a packing secured to the flange to hermetically abut against the internal wall of the dust collector casing. The assemblage thus formed has been disposed in a vent passageway leading to the electrically operated blower. In this measure that surface on which the outer peripheral edge of the filter abuts against the internal wall of the dust collection casing has been long and still extended along a complicated curved surface into which the dust collection casing has been formed. Thus that abutting surface has been apt to cause thereon a gap or gaps through which particularly fine dust particles can pass with the result that the filter has not sufficiently performed its function.

Further such a filter has generally incorporated integrally thereinto a dust removing device for removing dust adhering to the filtration surface thereof in order to prevent the filtration surface from being clogged with dust. Particularly fine dust particles can clog the filtration surface. In that event the dust removing device has been impossible for satisfactorily removing the fine dust particles from the filtration surface. Therefore if it is desired to remove the filter from the dust collector casing, it has been not suitable for any ordinary housewife to handle the filter because the abutting surface between the filter and the dust collector casing is complicated and makes the disengagement of the filter from the casing troublesome.

SUMMARY OF THE INVENTION

Accordingly, it is an object of the present invention to provide a new and improved electric cleaner device comprising a housing including an electrically operated blower therein, and a dust collector casing detachably engaging the housing and having a tubular filter readily mounted in and removable from the casing while maintaining the hermetic seal between the filter and the mounting therefor ensuring that a stream of sucked air and therefore dust particles caught by the stream can be prevented from leaking out around the mounting for the filter.

It is another object of the present invention to provide, in the electric cleaner device as described in the preceding paragraph, a new and improved dusting device for simply and rapidly removing dust particles adhering to the filtration surface of the filter.

According to one aspect of the present invention, there is provided an electric cleaner device comprising, in combination, a housing including an exhaust port and an electrically operated blower disposed therein, a dust collector casing detachably engaged by the housing and including a dust suction port and an opening for dumping dust, a tubular filter unit secured to the dust collector casing so as to be inserted into and pulled out from the latter through the interface at which the dust collector casing engages the housing, the filter unit having a vent opening formed only on that end face thereof adjacent to the interface of the casing and housing, an annular packing element secured to the outer peripheral edge of the end face of the filter unit, and a pushing element on the housing capable of pushing the packing element in the assembled position, the filter unit being sealed in the dust collector casing by having the packing element abutting against the dust collector casing while the pushing element pushes against the packing element to maintain the hermetic seal between the packing element and the dust collector casing.

According to another aspect of the present invention there is provided an electric cleaner device comprising, in combination, a main body including a suction port and an exhaust port and having an electrically operated blower disposed therein, a filter unit disposed within the main body to filter out dust particles contained in an air stream sucked into the main body through the suction port during operation of the electrically operated blower, the filter unit being of a rectangular box shape and having hermetically secured to a pair of opposite lateral walls pieces of filter paper and a vent opening disposed on one end face thereof to communicate the interior of the filter unit with the suction side of the electrically operated blower therethrough, and dusting means disposed in the vent opening to manually slide within the vent opening along the surfaces of the pieces of filter paper thereby to remove dust particles adhering to the filtration surfaces of the pieces of filter paper.

In a preferred embodiment of the present invention, the filter unit may include a pair of pieces of corrugated filter paper disposed in spaced opposite relationship, and a plurality of generally U-shaped vibratile strips connected to the internal surfaces of the pieces of corrugated filter paper to be interposed between respective pairs of opposite wave crests on the corrugated filter paper with the "U" opened to the vent opening. The filter unit is operatively associated with a vibration imparting element manually slidable along both the vent opening and the pieces of corrugated filter paper to successively flip and vibrate the free end portion of the legs of the "U."

BRIEF DESCRIPTION OF THE DRAWINGS

The present invention will become more apparent from the following detailed description taken in conjunction with the accompanying drawings in which.

DESCRIPTION OF THE PREFERRED EMBODIMENT

Figure 1:
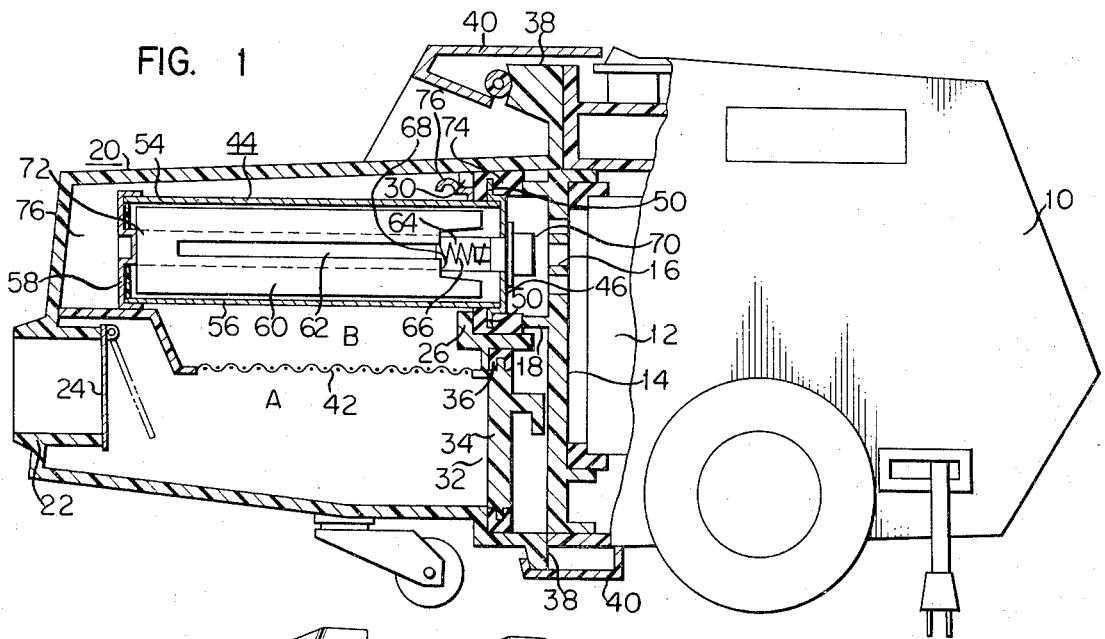
FIG. 1 is a side elevational view of an electric cleaner device constructed in accordance with the principles of the present invention with parts broken away to illustrate the internal construction thereof in longitudinal section.

Referring now to the drawings and FIG. 1 in particular, it is seen that an arrangement disclosed herein comprises a housing 10 having disposed therein an electrically operated blower 12 and rigidly secured to the front open end a frame member 14 including suction ports 16 and an annular protrusion 18 surrounding the suction ports 16, and a dust collector casing 20 detachably engaged at the rear open end by the housing 10 at the front end.

The dust collector casing 20 has a front end face provided in the lower portion with a dust suction port 22 including a check valve 24 and the rear open end into which a partition 26 is hermetically fitted and positioned in place. The partition 26 has formed on the upper portion an opening 28 (see FIG. 3) facing the suction ports 16 on the frame member 14 and a filter seat 30 defining the opening 28 and on the lower portion a dust dumping opening 32 closed by an openable cover plate 34 through a peripheral packing 36 interposed therebetween. The dust collector casing 20 has also disposed on the rear end a plurality of hooks 38 detachably engaged by the associated latches 40 disposed on the front end portion of the housing 10 whereby the dust collector casing 20 is in detachable engagement with the housing 10 as above described.

As shown in FIG. 1, a primary filter 42 of coarse mesh extends through the interior of the dust collector casing 20 substantially centrally and longitudinally thereof or in a direction substantially perpendicular to the rear open end face of the casing 20 by having its outer peripheral edge secured to both the internal wall surface of the casing 20 and the openable cover plate 34. In addition to filtering out coarse dust particles, the primary filter 42 serves to divide the interior of the casing 20 into a first and a second dust collection compartment "A" and "B" respectively. Disposed within the second dust collection compartment "B" is a secondary filter unit generally designated by the reference numeral 44.

Figure 4:
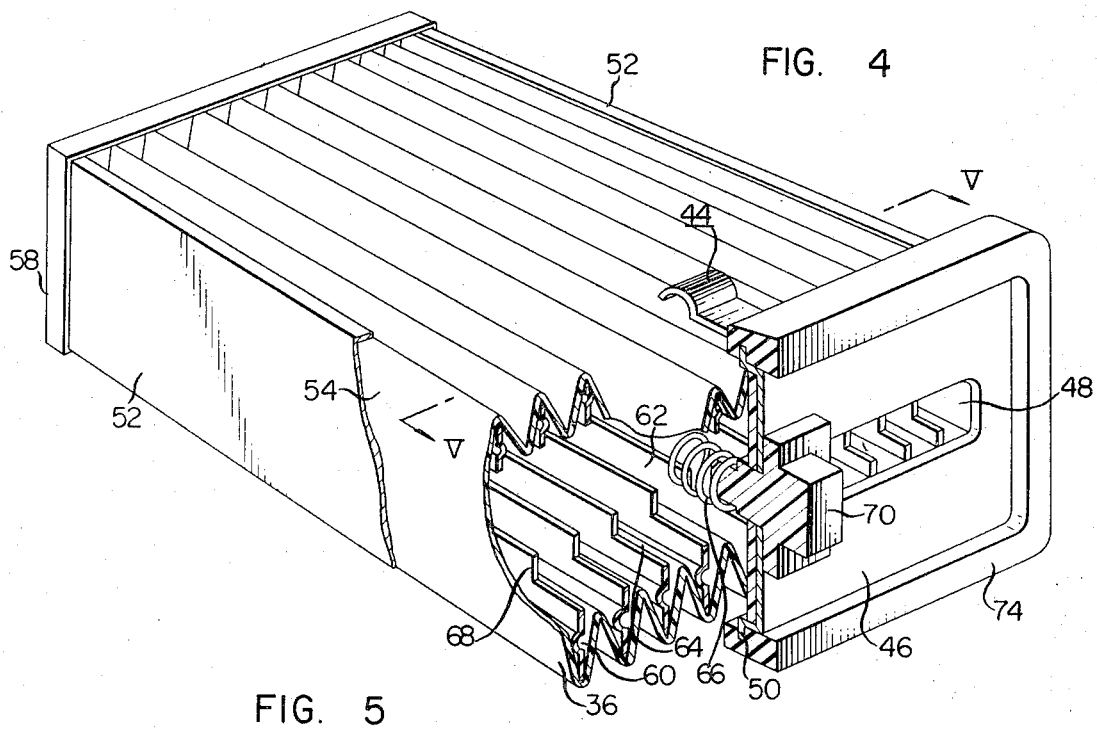
FIG. 4 is a perspective view of the filter unit shown in FIGS. 1, 2 and 3 with parts broken away to illustrate the internal construction thereof.

As best shown in FIG. 4, the secondary filter unit 44 is of a general rectangular box shape and includes a support 46 in the form of a rectangular dish provided at the central portion with an elongated vent opening 48 and at the outer peripheral edge with an outwardly directed flange 50, a pair of opposite lateral wall plates 52 of angular C-shaped cross section, and a pair of opposite pieces of corrugated sheet 54 and 56 of any suitable filtration material such as filter paper forming the other pair of opposite lateral walls. A rectangular end plate 58 having folded end portions on four sides thereof is disposed at that end of the filter unit 44 remote from the support 46 so that the folded end portions intimately contact the adjacent end portions of the lateral walls 52 and wave crests on the pieces of the corrugated sheet 54 and 56 thereby to maintain all the lateral walls in place with the support 46 to form an air duct T within the filter unit 44.

Figure 5:
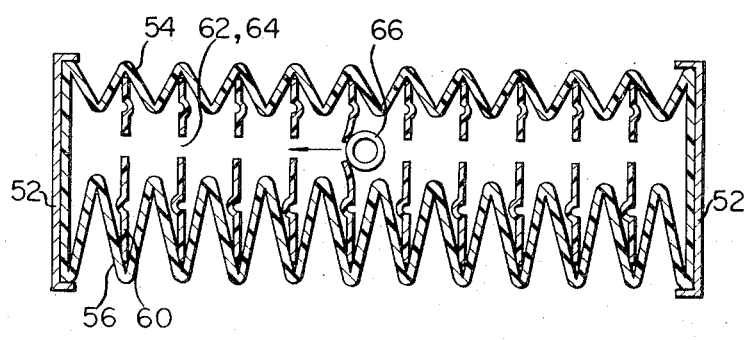
FIG. 5 is a cross sectional view of the filter unit taken along the line V — V of FIG. 4.

The filter sheet is comprised of a fine filtration medium produced by forming any suitable fibrous material into a sheet and is preferably folded into a corrugated shape to increase the area of the filtering surface. As best shown in FIG. 5, both filter sheets 54 and 56 are disposed in spaced opposite relationship so that wave crests on both pieces run perpendicularly to the plane of the support 46 or the end plate 58 and so that the wave crests and valleys (as viewed in one direction) on one of the corrugated pieces directly oppose the wave valleys and crests (as viewed in the same direction) on the other piece respectively with the general planes of both pieces spaced in substantially parallel relation, away from each other. Further the filter sheets 54 and 56 preferably have different distances between the wave crest and valley, in order to differentiate the two sheets 54 and 56 from each other in surface area. For example, the lower corrugated sheet 56 is shown in FIG. 5 as having a greater distance between the wave crest and valley than the upper sheet 54. In the example illustrated, the lower sheet 56 is larger in surface area than the upper sheet 54.

The opposite ends of each sheet 54 or 56 are bonded to the support and end plates 46 and 58 respectively by means of any suitable bonding agent such as a synthetic resin or a synthetic rubber ensuring the hermetic sealing therebetween during long service.

One vibrating strip 60 of generally U-shape (see FIG. 1) is rigidly secured to each wave crest on the upper corrugated sheet 54 and the opposite wave crest on the lower sheet 56 as viewed externally of the filter unit such that the bottom portion of the "U" is connected to those portions of both sheets adjacent the end plate 58 while the legs of the "U" extend toward the support 46 to leave a slit 62 therebetween. The legs of the "U" have their free end portions reduced in width to leave therebetween a slit 64 wider than the slit 62 and open at that end adjacent to the support 46.

The legs of the U-shaped strips 60 have respective zigzag ridges 64 formed on the opposite surfaces thereof as by embossing (see FIG. 5), in order to prevent those portions of each sheet on both sides of the strip from adhering to each other due to a suction force from the blower 12.

In FIG. 1, a helically coiled element 66 is shown as being disposed within the slit 64 with the free end thereof abutting against the strip 60 adjacent a step 68 formed between the slits 62 and 64. The coiled element 66 is formed of any suitable resilient material wound into a helical coil and has the other end fixed to a dusting knob 70 slidably extending through the slot 48 on the support 46. The knob 70 is adapted to manually slide along the vent opening 48. This causes the coiled element 66 to successively abut against the vibratile strips 60 adjacent steps 68 formed between the slits 62 and 64 to vibrate the strips 60 and therefore the corrugated sheets 54 and 56 in a manner as will be described hereinafter. Thus the coiled element 66 acts as a vibration imparting element.

Figure 3:
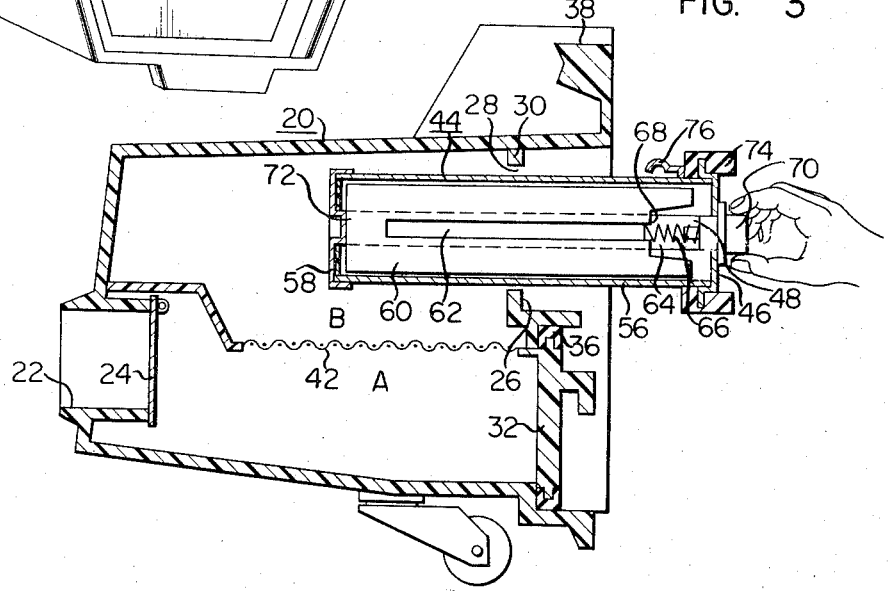
FIG. 3 is a sectional view illustrating the manner in which the filter unit shown in FIGS. 1 and 2 is manually removed from the dust collector casing.

The end plate 58 is shown in FIGS. 1 and 3 as including a central portion 72 recessed toward the support 46. The recess 72 serves to position the vibratile strips 60 upon assembling them and also to prevent the vibratile strips 60 of the filter sheet from being bonded to the end plate 58 upon bonding the pieces of filter sheet 54 and 56 to the end plate.

As shown in FIGS. 1 and 3, the peripheral flange 50 of the support 46 is embedded in a packing 74 formed of any suitable resilient material. A leaf spring 76 projects from the packing 74 over the upper corrugated sheet 54. In the assembled position, the leaf spring 76 resiliently engages the filter seat 30.

The secondary filter unit 44 is adapted to be inserted into the second collection compartment B through the opening 28 on the partition 26 until the packing 74 abuts against the filter seat 30. At that time, the filter unit 44 is held by the partition 26 through the packing 74 by means of the action of the leaf spring 76.

When the dust collector casing 20 is engaged by the housing 10, the annular protrusion 18 pushes against the packing 74 to hermatically press and seal it against the filter seat 30.

As shown in FIG. 1, the filter unit put in place within the collection compartment B forms a space 76 between the end plate 58 of the filter unit 44 and the adjacent portion of the front face of the collector casing 20 for accumulating dust particles therein.

The arrangement thus described is operated as follows: After the suction port 22 has been connected to a suction hose (not shown), the electrically operated blower 12 can be put in operation. Then dust particles along with the air are sucked into the dust collector casing 20 through the suction port 22 with the check valve 24 in its open position as shown at dotted line in FIG. 1. In the casing 20 coarse dust particles are filtered out by the primary filter 42 and accumulated in the dust collection compartment A disposed in the lower portion of the casing 20. Fine dust particles can pass through the primary filter 42 with the sucked air, after which they are caught by the secondary filter unit 44 and strictly, by the corrugated filter sheets 54 and 56 and then accumulated in the second collection compartment B.

As above described, the filter sheets 54 and 56 are of a corrugated cross section and disposed in opposite relationship to form the air duct T therebetween. Therefore the air stream passes through both sheets 54 and 56 from their outer surfaces to their inner surfaces to enter the air duct T. Then the air stream from the air duct T passes through the vent opening 48 in the support 46 and thence through the suction ports and blower 16 and 12 respectively. The air stream passed through the blower 12 is exhausted to the atmosphere through an exhaust port disposed in the rear face of the housing 10 although the exhaust port is not illustrated.

After the particular cleaning has been completed, the blower 12 is deenergized and then the latches 40 are released from the hooks 38 to permit the dust collector casing 20 to disengage from the housing 10. The dust collector casing 20 removed from the housing 10 can be turned upside down after the removal of the cover plate 34. This results in the dumping of those dust particles accumulated in the first dust collection compartment A.

Figure 6:
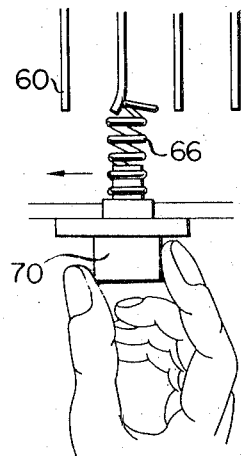
FIG. 6 is a side elevational view of the knob portion of the dusting unit shown in FIG. 4.

If the secondary filter unit 44 has been clogged with fine dust particles, then the dusting knob 70 can manually slide in the direction of the arrow shown in FIGS. 5 and 6 and then the direction opposite thereto along the vent opening 48 on the support 46. This sliding movement of the knob 70 causes the coiled element 66 to successively impart vibration to the vibration strips 60 with the result that those fine dust particles adhering to the filter sheets 54 and 56 are caused to float off and drop from the sheets.

In this way, fine dust particles passed through the primary filter 42 are successively caught by the corrugated sheets 54 and 56 after which the dust particles can readily be removed from the sheets by the operation of the knob 70. In order to ensure that those fine dust particles which fall into the wave valleys on the corrugated sheet are removed therefrom, it is required to effectively vibrate the entire area of the filter sheet. According to the present invention, the corrugated sheets 54 and 56 are disposed in opposite relationship to form therebetween the air duct T within which a plurality of U-shaped vibratile strips 60 are disposed to form the respective slits 62 open at one end between the associated pairs of wave crests on the sheets. Both legs of the U-shaped strip 60 include a pair of zigzag ridges 64 directed in opposite directions respectively whereby both sheets 54 and 56 are prevented from adhering to each other whereby the suction effect is enhanced.

In order to remove dust particles from the filter sheets 54 and 56, the dusting knob 70 can slide along the vent opening 48 in the support 46 of the filter unit 44 to permit the coiled element 68 connected to the knob 70 to successively abut against the vibratile strips 60 thereby to displace the free ends thereof as shown in FIGS. 5 and 6. When the coiled element 68 disengages from that vibratile strip 60 with its free end displaced, the same strip vibrates to vibrate the adjacent portion of each sheet. The process as above described is repeated with each of the vibratile strips 60 to propagate that vibration throughout the area of each filter sheet resulting in the complete removal of dust particles from the filter sheet. It is noted that each strip 60 can readily be displaced because the coiled element 68 is adapted to abut against the free end portions of the legs of each strip. This is very effective for propagating the vibration to the opposite pieces of filtering sheet.

For removing dust particles from corrugated filters formed of the filter paper, it has been commonly practiced to impart the vibrational movement to the entire structure thereof. Also it has been difficult to separately impart vibrational movement to each of the waves on the corrugated filter. The removal of dust particles from the filters may be accomplished by beating them with a bar or vibrating them on the ground. These measures may result in damage to the filter paper involved. The present invention eliminates these disadvantages by the provision of means for vibrating the pieces of filter sheet through the vibratile strips as above described.

The results of experiments conducted with the filter unit 44 arranged to filter out finely pulverized particles of talc or the like indicated that, after the filter unit had been completely clogged with such talc particles, the dusting knob 70 was manually caused to reciprocate the elongated vent opening 48 several times until the filter unit was restored substantially to its original state prior to sucking the finely pulverized particles. This means that a strong suction force is retained.

Figure 7:
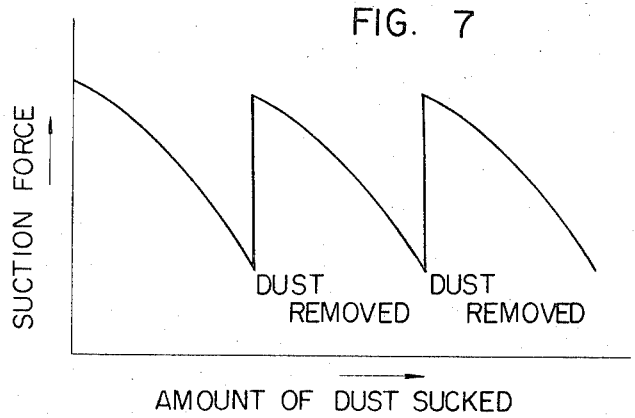
FIG. 7 is a graph illustrating the relationship between an amount of dust sucked and a force for sucking dust.

FIG. 7 shows one example of the results of experiments as above described. As seen from FIG. 7, the ability to filter dust particles decreases with the amount of dust accumulated on the filter sheet until the sheet is completely clogged with dust particles. At that time, the dusting knob is simply manually operated to remove the dust particles from the filter sheet thereby to substantially eliminate the clogging of the filtering sheet to substantially restore its original ability to filter dust.

Figure 2:
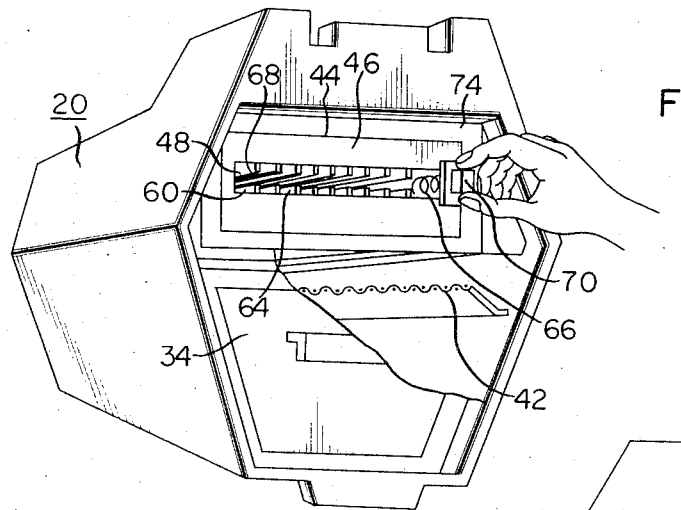
FIG. 2 is a perspective view of the dust collector casing shown in FIG. 1.

For removing dust particles adhering to the secondary filter unit from the latter, the dusting knob can be manually operated with the filter unit 44 secured to the dust collector casing 20 as shown in FIG. 2. Alternatively the operation of removing dust particles may be performed with the filter unit 44 pulled out of the dust collector casing 20 as shown in FIG. 3 and suitably disposed externally of the casing 20.

The present invention has several advantages. For example, the filter unit can be inserted into and pulled out of the dust collector casing a simple manner while ensuring that dust particles are prevented from leaking through the mounting for the filter unit. Also the removal of dust particles adhering to the filter unit is accomplished by a simple easy operation as above described.

While the present invention has been illustrated and described in conjunction with a single preferred embodiment thereof it is to be understood that various changes and modifications may be resorted to without departing from the spirit and scope of the invention.

What we claim is:

1. An electric cleaner device comprising, in combination, a housing including an exhaust port and an electrically operated blower disposed therein, a dust collector casing detachably engaged by said housing, said dust collector casing including a dust suction port and an opening for dumping dust, a tubular filter unit having end faces secured to an opening in a partition of said dust collector casing so as to be inserted into and pulled out from the latter through the interface at which said dust collector casing engages said housing, said filter unit having a vent opening formed only on that end face thereof adjacent to said interface of said dust collector casing and said housing, an annular packing element secured to the outer periphery of said end face of said filter unit, and a pushing element on said housing capable of engaging said packing element in the assembled position, said filter unit being sealed in said dust collector casing by having said packing element abutting against said dust collector casing while said pushing element pushes against the packing element to maintain the hermetic seal between said packing element and said dust collector casing.

2. An electric cleaner device as claimed in claim 1, wherein said housing includes a suction port at said interface communicating with the suction side of said electrically operated blower and said pushing element comprises an annular protrusion surrounding said suction port.

3. An electric cleaner device comprising, in combination, a main body including a suction port and an exhaust port and having an electrically operated blower disposed therein, a filter unit disposed within said main body to filter out dust particles contained in an air stream sucked into said main body through said suction port during the operation of said blower, said filter unit being of a rectangular box shape with end faces having hermetically secured to a pair of opposite lateral walls pieces of filter paper and a vent opening disposed on one end face thereof to communicate the interior of said filter unit with the suction side of said electrically operated blower therethrough and dusting means disposed in said vent opening to manually slide within said vent opening along the surfaces in contact with said pieces of filter paper thereby to remove dust particles adhering to the filtering surfaces of said pieces of filter paper.

4. An electric cleaner device as claimed in claim 3, wherein said filter unit includes a pair of pieces of corrugated filter paper disposed in spaced opposite relationship and a plurality of generally U-shaped vibratile strips connected to the internal surfaces of said pieces of corrugated filter paper to be interposed between respective pairs of opposite wave crests on the corrugated filter paper with the "U" opened to said vent opening, said filter unit being operatively associated with a vibration imparting element manually slidable along said vent opening and said pieces of corrugated filter paper to successively flip and vibrate the free end portions of the legs of the "U."

* * * * *